(12) United States Patent
Song et al.

(10) Patent No.: US 11,797,862 B2
(45) Date of Patent: Oct. 24, 2023

(54) EXTREME LANGUAGE MODEL COMPRESSION WITH OPTIMAL SUB-WORDS AND SHARED PROJECTIONS

(71) Applicant: Google LLC, Mountain View, CA (US)

(72) Inventors: Yang Song, Bellevue, WA (US); Raghav Gupta, Mountain View, CA (US); Dengyong Zhou, Redmond, WA (US); Sanqiang Zhao, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 614 days.

(21) Appl. No.: 16/749,570

(22) Filed: Jan. 22, 2020

(65) Prior Publication Data

US 2021/0224660 A1 Jul. 22, 2021

(51) Int. Cl.
*G06N 3/088* (2023.01)
*G06F 40/284* (2020.01)
*G06N 3/045* (2023.01)

(52) U.S. Cl.
CPC ........... *G06N 3/088* (2013.01); *G06F 40/284* (2020.01); *G06N 3/045* (2023.01)

(58) Field of Classification Search
CPC ..... G06N 3/088; G06N 3/0454; G06F 40/284
See application file for complete search history.

(56) References Cited

U.S. PATENT DOCUMENTS

| | | | | |
|---|---|---|---|---|
| 2019/0205748 A1* | 7/2019 | Fukuda | ................ | G06N 3/0454 |
| 2019/0266236 A1* | 8/2019 | Battach | ................ | G06N 3/0454 |
| 2019/0266250 A1* | 8/2019 | Toplyn | ................... | G10L 15/26 |
| 2020/0027444 A1* | 1/2020 | Prabhavalkar | .......... | G10L 25/30 |
| 2020/0111483 A1* | 4/2020 | Shafran | .................... | G06N 3/02 |
| 2020/0135174 A1* | 4/2020 | Cui | ........................ | G10L 25/03 |

(Continued)

OTHER PUBLICATIONS

Al-Rfou et al., "Conversational Contextual Cues: The Case of Personalization and History for Response Ranking" arXiv:1606.00372, Jun. 1, 2016, 10 pages.

(Continued)

*Primary Examiner* — Michael N Opsasnick
(74) *Attorney, Agent, or Firm* — Dority & Manning, P.A.

(57) ABSTRACT

Provided is a knowledge distillation technique for training a student language model that, relative to a larger teacher language model, has a significantly smaller vocabulary, lower embedding dimensions, and/or hidden state dimensions. Specifically, aspects of the present disclosure are directed to a dual-training mechanism that trains the teacher and student language models simultaneously to obtain optimal word embeddings for the student vocabulary. In some implementations, this approach can be combined with learning shared projection matrices that transfer layer-wise knowledge from the teacher language model to the student language model. Example experimental results have also demonstrated higher compression efficiency and accuracy when compared with other state-of-the-art compression techniques, including the ability to compress the $BERT_{BASE}$ model by more than 60×, with only a minor drop in downstream task metrics, resulting in a language model with a footprint of under 7 MB.

20 Claims, 7 Drawing Sheets

(56) References Cited

U.S. PATENT DOCUMENTS

| | | | |
|---|---|---|---|
| 2020/0234694 A1* | 7/2020 | Griffiths | G10L 15/144 |
| 2021/0065699 A1* | 3/2021 | Kaushik | G10L 15/187 |
| 2021/0141798 A1* | 5/2021 | Steedman Henderson | G06N 3/0454 |
| 2021/0182662 A1* | 6/2021 | Lai | G06N 3/08 |

OTHER PUBLICATIONS

Anwar et al., "Structured Pruning of Deep Convolutional Neural Networks", ACM Journal on Emerging Technologies in Computing Systems, vol. 13, No. 3, Dec. 2015, 11 pages.

Ba et al., "Do Deep Nets Really Need to be Deep?", Twenty-eighth Conference on Neural Information Processing Systems, Dec. 8-13, 2014, Montreal, Canada, 9 pages.

Chen et al., "Compressing Neural Networks with the Hashing Trick", International Conference on Machine Learning, Jul. 6-11, 2015, Lille, France, 10 pages.

Devlin et al., "BERT: Pre-training of Deep Bidirectional Transformers for Language Understanding", arXiv:1810.04805v1, Oct. 11, 2018, 14 pages.

Dolan et al., "Automatically Constructing a Corpus of Sentential Paraphrases", Third International Workshop on Paraphrasing, Oct. 2005, Jeju Island, Korea, 8 pages.

Glorot et al., "Understanding the difficulty of training deep feedforward neural networks" Thirteenth International Conference on Artificial Intelligence and Statistics, May 13-15, 2010, Sardinia, Italy, 8 pages.

Gong et al., "Compressing Deep Convolutional Networks Using Vector Quantization", arXiv:1412.6115v1, Dec. 18, 2014, 10 pages.

Hinton et al., "Distilling the Knowledge in a Neural Network", arXiv:1503.02531v1, Mar. 9, 2015, 9 pages.

Huang et al., "Like What You Like: Knowledge Distill via Neuron Selectivity Transfer", arXiv:1707.01219v2, Dec. 18, 2017, 9 pages.

Joulin et al., "FastText.Zip: Compressing Text Classification Models", arXiv:1612.03651v1, Dec. 12, 2016, 13 pages.

Kim et al., "Sequence-Level Knowledge Distillation", arXiv:1606.07947v4, Sep. 22, 2016, 11 pages.

Lai et al., "RACE: Large-scale ReAding Comprehension Dataset From Examinations", Conference on Empirical Methods in Natural Language Processing, Sep. 7-11, 2017, Copenhagen, Denmark, 10 pages.

Lample et al., Cross-lingual Language Model Pretraining, arXiv:1901.07291v1, Jan. 22, 2019, 10 pages.

Li et al., "Pruning Filters for Efficient ConvNets", arXiv:1608.08710v2, Sep. 15, 2016, 9 pages.

Lin et al., "Fixed Point Quantization of Deep Convolutional Networks", International Conference on Machine Learning, Jun. 19-24, 2016, New York City, NY, 10 pages.

Lin et al., "Towards Accurate Binary Convolutional Neural Network", Thirty-first Conference on Neural Information Processing Systems, Dec. 4-9, 2017, Long Beach, CA, 9 pages.

Luo et al., "ThiNet: A Filter Level Pruning Method for Deep Neural Network Compression", IEEE International Conference on Computer Vision (ICCV), Oct. 22-29, 2017, Venice, Italy, 9 pages.

Mikolov et al., "Distributed Representations of Words and Phrases and their Compositionality", Twenty-seventh Conference on Neural Information Processing Svstems, Dec. 5-10, 2013, Lake Tahoe, NV, 9 pages.

Pennington et al., "GloVe: Global Vectors for Word Representation", Conference on Empirical Methods in Natural Language Processing, Oct. 25-29, 2014, Doha, Qatar, 12 pages.

Peters et al., Deep Contextualized Word Representations. 2018 Conference of the North American Chapter of the Association for Computational Linguistics: Human Language Technologies, Jun. 1-6, 2018, New Orleans, Louisiana, pp. 2227-2237.

Radford et al., Language Models are Unsupervised Multitask Learners, 2019, 24 pages.

Rajpurkar et al., "Squad: 100,000+ Questions for Machine Comprehension of Text", arXiv:1606.05250v3, Oct. 11, 2016, 10 pages.

Romero et al., "FitNets: Hints for Thin Deep Nets", arXiv:1412.6550v1, Dec. 19, 2014, 12 pages.

See et al., "Compression of Neural Machine Translation Models via Pruning", 20th SIGNLL Conference on ComputationalNatural Language Learning, Aug. 7-12, 2016, Berlin, Germany, pp. 291-301.

Sennrich et al., "Neural Machine Translation of Rare Words with Subword Units", arXiv:1508.07909v5, Jun. 10, 2016, 11 pages.

Shen et al., "Q-BERT: Hessian Based Ultra Low Precision Quantization of BERT" arXiv:1909.05840v2, Sep. 22, 2019, 15 pages.

Sindhwani et al., "Structured Transforms for Small-Footprint Deep Learning", Twenty-ninth Conference on Neural Information Processing Systems, Dec. 7-12, 2015, Montreal, Canada, 9 pages.

Socher et al., "Recursive Deep Models for Semantic Compositionality Over a Sentiment Treebank", Conference on Empirical Methods in Natural Language Processing, Oct. 18-21, 2013, Seattle, WA, 12 pages.

Sun et al., "Patient Knowledge Distillation for BERT Model Compression", arxiv:1908.09355v1, Aug. 25, 2019, 10 pages.

Tang et al., "Distilling Task-Specific Knowledge from BERT into Simple Neural Networks", arXiv:1903.12136v1, Mar. 28, 2019, 8 pages.

Tulloch et al., "High performance ultra-low-precision convolutions on mobile devices", arXiv:1712.02427v1, Dec. 6, 2017, 5 pages.

Wang et al., "GLUE: A Multi-Task Benchmark and Analysis Platform for Natural Language Understanding", Conference on Learning Representations, May 6-9, 2019, New Orleans, Louisiana, 20 pages.

Williams et al., "A Broad-Coverage Challenge Corpus for Sentence Understanding through Inference" arXiv:1704.05426v4, Feb. 19, 2018, 11 pages.

Wu et al., "Binarized Neural Networks on the ImageNet Classification Task", arxiv:1604.03058v5, Nov. 19, 2016, 4 pages.

Wu et al., "Google's Neural Machine Translation System: Bridging the Gap between Human and Machine Translation", arxiv:1609.08144v2, Oct. 8, 2016, 23 pages.

Yang et al., "XLNet: Generalized Autoregressive Pretraining for Language Understanding", arXiv:1906.08237v1, Jun. 19, 2019, 18 pages.

Yim et al., "A Gift from Knowledge Distillation: Fast Optimization, Network Minimization and Transfer Learning", IEEE Conference on Computer Vision and Pattern Recognition, Jul. 21-26, 2017, Honolulu, Hawaii, pp. 4133-4141.

You et al., "Large Batch Optimization for Deep Learning: Training BERT in 76 Minutes", arXiv:1904.00962v3, May 24, 2019, 36 pages.

Yu et al., "On-Device Neural Language Model based Word Prediction", 27th International Conference on Computational Linguistics: System Demonstrations, Aug. 20-26, 2018, Sante Fe, NM, pp. 128-131.

Zagoruyko et al., Paying More Attention to Attention: Improving the Performance of Convolutional Neural Networks via Attention Transfer, arXiv:1612.02928v1, Dec. 12, 2016, 12 pages.

Zhou et al., "Adaptive Quantization for Deep Neural Network", arXiv:1712.01048v1, Dec. 4, 2017, 14 pages.

Zhu et al., "Aligning Books and Movies: Towards Story-like Visual Explanations by Watching Movies and Reading Books", IEEE International Conference on Computer Vision, Dec. 11-18, 2015, Santiago, Chile, pp. 19-27.

\* cited by examiner

EXTREME LANGUAGE MODEL COMPRESSION WITH OPTIMAL SUB-WORDS AND SHARED PROJECTIONS

FIELD

The present disclosure relates generally to machine learning for natural language processing (NLP). More particularly, the present disclosure relates to a dual-training mechanism that trains teacher and student language models simultaneously to obtain optimal word embeddings for the student vocabulary.

BACKGROUND

Pre-trained deep neural network language models such as ELMo, GPT, BERT and XLNet have recently achieved state-of-the-art performance on a variety of language understanding tasks. However, their size makes them impractical for a number of scenarios, especially on mobile and edge devices. In particular, the input word embedding matrix accounts for a significant proportion of the model's memory footprint, due to the large input vocabulary and embedding dimensions. While knowledge distillation techniques have had success at compressing large neural network models, they have generally been ineffective at yielding student language models with vocabularies different from the original teacher language models.

SUMMARY

Aspects and advantages of embodiments of the present disclosure will be set forth in part in the following description, or can be learned from the description, or can be learned through practice of the embodiments.

One example aspect of the present disclosure is directed to a computing system that performs language model compression. The computing system includes one or more processors and one or more non-transitory computer-readable media that collectively store: a teacher language model, wherein a teacher vocabulary that contains a plurality of teacher sub-words is associated with the teacher language model, and wherein a plurality of teacher sub-word embeddings are respectively associated with the plurality of teacher sub-words; a student language model, wherein a student vocabulary that contains a plurality of student sub-words is associated with the student language model, wherein a plurality of student sub-word embeddings are respectively associated with the plurality of student sub-words, and wherein a number of student sub-words contained in the student vocabulary is less than a number of teacher sub-words contained in the teacher vocabulary; and instructions that, when executed by the one or more processors, cause the computing system to perform operations. The operations include obtaining a natural language training input; generating a first sub-word version of the natural language training input that comprises at least one of the teacher sub-word embeddings associated with the teacher vocabulary and at least one of the student sub-word embeddings associated with the student vocabulary; inputting the first sub-word version of the natural language training input into at least the teacher language model; receiving a teacher output generated by the teacher language model based on the first sub-word version of the natural language training input; evaluating a loss function to determine a loss associated with the teacher output; and modifying at least one of the plurality of student sub-word embeddings based at least in part on the loss associated with the teacher output.

Another example aspect of the present disclosure is directed to a computer-implemented method. The method includes: obtaining data descriptive of a teacher vocabulary that contains a plurality of teacher sub-words and a student vocabulary that contains a plurality of student sub-words, wherein a plurality of teacher sub-word embeddings are respectively associated with the plurality of teacher sub-words and a plurality of student sub-word embeddings are respectively associated with the plurality of student sub-words, and wherein a number of student sub-words contained in the student vocabulary is less than a number of teacher sub-words contained in the teacher vocabulary; obtaining a natural language training input; generating a sub-word version of the natural language training input that comprises at least one of the teacher sub-word embeddings associated with a teacher vocabulary and at least one of the student sub-word embeddings associated with a student vocabulary; inputting the sub-word version of the natural language training input into a language model; receiving an output generated by the language model based on the sub-word version of the natural language training input; evaluating a loss function to determine a loss associated with the output; and modifying, based at least in part on the loss associated with the output, one or both of: at least one of the plurality of student sub-word embeddings; and at least one parameter value of the language model.

Another example aspect of the present disclosure is directed to one or more non-transitory computer-readable media that collectively store: a teacher language model that comprises one or more teacher intermediate layers; a student language model that comprises one or more student intermediate layers that respectively correspond to the one or more teacher intermediate layers to form one or more pairs; and instructions that, when executed by one or more processors, cause the one or more processors to perform operations. The operations include, for each of the one or more pairs of teacher intermediate layers and student intermediate layers: projecting teacher parameter values of the teacher intermediate layer or student parameter values of the student intermediate layer into a shared space; determining a loss value based on a difference between the teacher parameter values of the teacher intermediate layer and the student parameter values of the student intermediate layer within the shared space; and modifying at least one of the teacher parameter values of the teacher intermediate layer or the student parameter values of the student intermediate layer to reduce the loss value.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to a knowledge distillation technique for training a student language model that, relative to a larger teacher language model, has a significantly smaller vocabulary, lower embedding dimensions, and/or hidden state dimensions. Specifically, aspects of the present disclosure are directed to a dual-training mechanism that trains the teacher and student language models simultaneously to obtain optimal word embeddings for the student vocabulary. In some implementations, this approach can be combined with learning shared projection matrices that transfer layer-wise knowledge from the teacher language model to the student language model. Example experimental results have also demonstrated higher compression efficiency and accuracy when compared with other state-of-the-art compression techniques, including the ability to compress the $BERT_{BASE}$ model by more than 60×, with only a minor drop in downstream task metrics, resulting in a language model with a footprint of under 7 MB.

More particularly, recent contextual-aware language models such as ELMo, GPT, BERT and XLNet have shown to greatly outperform traditional word embedding models including Word2Vec and GloVe in a variety of NLP tasks. These pre-trained language models, when fine-tuned on downstream language understanding tasks such as sentiment classification, natural language inference, and reading comprehension, have achieved state-of-the-art performance. However, the large number of parameters in these models, often above hundreds of millions, makes it impossible to host them on resource-constrained tasks or environments such as doing real-time inference on mobile or edge devices.

Besides utilizing model quantization techniques which simply reduce the floating-point accuracy of the parameters, significant recent research has focused on knowledge distillation techniques. In knowledge distillation techniques, the goal is to train a small-footprint student language model by borrowing knowledge, such as through a soft predicted label distribution, from a larger pre-trained teacher language model.

However, a significant bottleneck that has been overlooked by previous efforts is the input vocabulary size and its corresponding word embedding matrix, often accounting for a significant proportion of all model parameters. For instance, the embedding table of the $BERT_{BASE}$ model, which includes over 30K WordPiece tokens, accounts for over 21% of the model size. While there has been existing work on reducing language model vocabulary sizes, existing distillation techniques cannot utilize these, since typical distillation techniques require the student and teacher language models to share the same vocabulary and output space. This profoundly limits their potential to further reduce model sizes.

The present disclosure presents systems and methods which improve the effectiveness of knowledge distillation, in particular for pre-trained language models such as BERT. In particular, certain implementations of the proposed techniques are effective to reduce model sizes to as much as a few mega-bytes. One aspect of the proposed techniques is the use of a significantly smaller vocabulary for a student language model learned during distillation. In addition, instead of distilling solely on the teacher language model's final-layer outputs, in some implementations, the proposed techniques leverage layer-wise teacher language model parameters to directly optimize the parameters of the corresponding layers in the student language model.

More particularly, one aspects of the present disclosure is directed to a dual training technique. In the dual training technique, a teacher language model and a student language model have different vocabularies and incompatible tokenizations for the same sequence. To address this during distillation, the teacher language model and/or student language model can be fed a mix of teacher vocabulary-subword and student vocabulary-sub-word words within a single sequence. Coupled with the masked language modeling task, this encourages an implicit alignment of the teacher and student embeddings, since the student vocabulary embedding may be used as context to predict a subword of the teacher vocabulary, and vice versa.

Another example aspect of the present disclosure is directed to shared variable projections. In particular, to minimize the loss of information from reducing the hidden state dimension, a separate loss can be introduced to align the teacher and student language models' trainable variables. This allows for more direct layer-wise transfer of knowledge from the teacher language model to the student language model.

The systems and methods of the present disclosure provide a number of technical effects and benefits. As one example technical effect and benefit, the proposed systems and methods enable learning of a student language model with a significantly reduced size relative to a teacher model (e.g., a "compressed" student model). This significantly smaller student model requires less memory usage to store. The smaller student model will also often be faster to run or, stated differently, exhibit less latency. Thus, aspects of the present disclosure enable savings of computing resources such as memory usage, processor usage, network bandwidth, and the like. In particular, by reducing the size of the language model, the language model can more easily be deployed to perform on-device inference in a resource-constrained environment such as a mobile or edge device. Be enabling on-device inference, latency experienced by the user can further be reduced as round trip communication to a higher order device can be eliminated. Likewise, user privacy can be enhanced as language data can be processed on the device, without being transmitted to a cloud server.

Another example technical effect is the ability to produce a student language model that has an architecture that matches desired characteristics for improved efficiency by a certain hardware system such as a specific hardware system of an edge or mobile device. Thus, the architecture of the student model can be selected based on the hardware system (e.g., type and/or configuration of processor(s)) of the specific system at which the student model will be deployed. The student model's architecture can be the same as or different from the teacher model's architecture. A model's architecture can include the type, number, and dimensionality of layers, among other characteristics.

Using the combination of dual training and shared variable projections, example experiments were performed to train a 12-layer highly-compressed student BERT model, achieving a maximum compression ratio of ~61.94× (with 48 dimension size) compared to the teacher $BERT_{BASE}$ model. Example experiments were conducted for measuring both generalized language modeling perspective and for downstream tasks, demonstrating competitive performance with high compression ratios for both families of tasks. Details of these example experiments are described in Extreme Language Model Compression with Optimal Subwords and Shared Projections, Zhao et al. (2019) (available at https://arxiv.org/pdf/1909.11687.pdf).

A language model is a model configured to process language inputs. Example language models include ELMo, GPT, BERT, XLNet, and derivatives thereof. A language model can but is not required to include one or more transformer layers. Another example language model is a neural network (e.g., a recurrent neural network such as an LSTM network) configured to process language inputs. One example is a sequence to sequence LSTM network. The systems and methods described herein can be applied to any language models such as any language models that operate to receive and process embedded representations of language as inputs.

A language model can perform any number of different language processing tasks. Example language processing tasks include asked language modeling, two-way sentence sentiment classification, two-way sentence pair classification, next sentence prediction, medical record analysis/autocompletion, search query processing, translation, artificial intelligence-based assistant tasks such as question answering, tokenization; sentence boundary detection; shallow parsing; part-of-speech tagging; selectional preference; syntax parsing; dependency parsing; constituency parsing; semantics; semantic role labeling; spatial role labeling; opinion mining; word sense disambiguation/induction; and/or others.

With reference now to the Figures, example embodiments of the present disclosure will be discussed in further detail.

Example Distillation Approach

Figure 1:
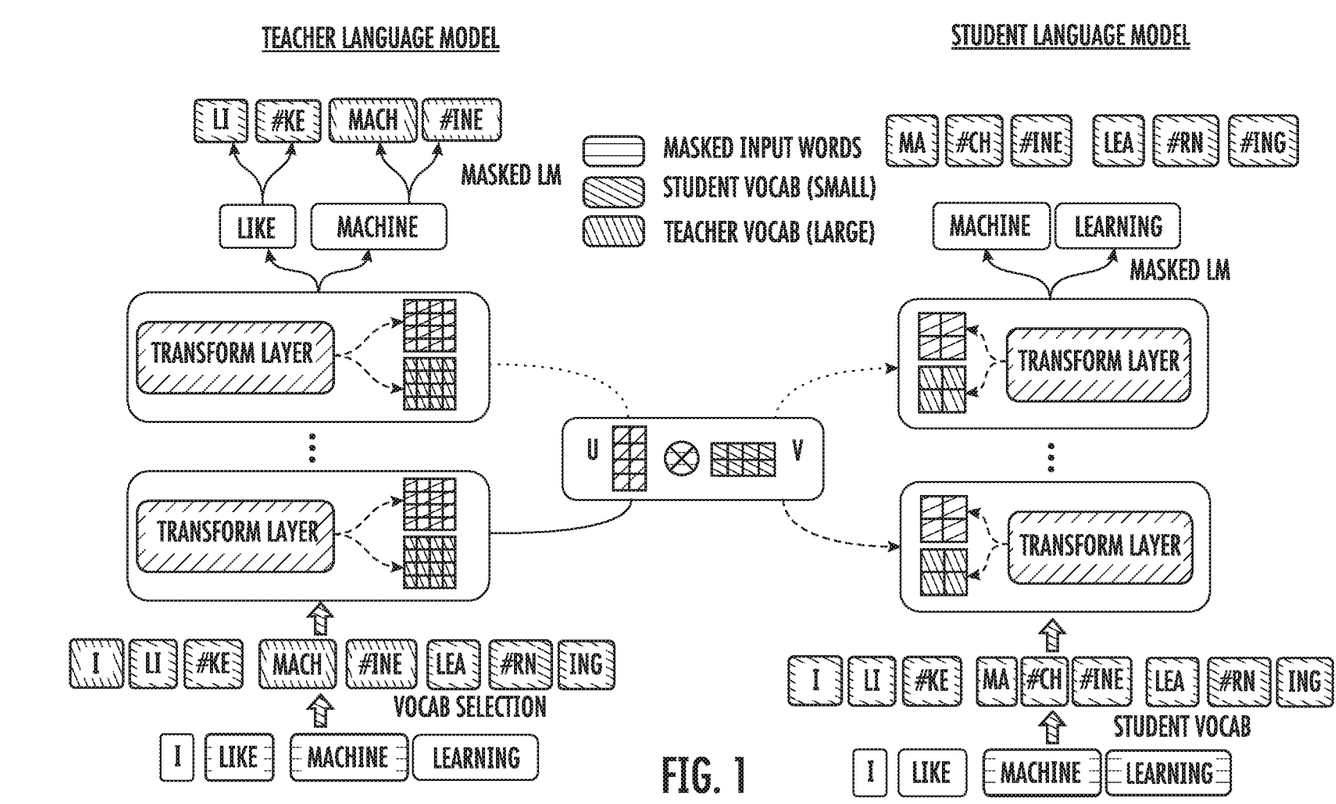
FIG. 1 depicts an example distillation technique to distill knowledge from a teacher language model to a smaller student language model.

FIG. 1 depicts an example distillation technique to distill knowledge from a teacher language model (illustrated generally on the left hand side) to a smaller student language model (illustrated generally on the right hand side). The illustrated distillation approach reduces the number of subwords in the model vocabulary. This section first discusses the rationale behind this reduction and the challenges it introduces. Next, this section provides example details for the proposed techniques, namely dual training and shared projection. Further, although FIG. 1 illustrates the simultaneous use of both the dual training technique and the shared variable projections, these two techniques can also be used independently of each other.

Example Optimal Sub-Word Embeddings Via Knowledge Distillation

Example implementations of the proposed techniques follow the general knowledge distillation paradigm of training a smaller student model from a larger teacher model. As one example that was experimentally assessed, an example teacher model is a 12-layer uncased $BERT_{BASE}$, trained with 30,522 WordPiece tokens and 768-dimensional embeddings and hidden states. The teacher model parameters can be denoted by $\theta_t$. As another example that was experimentally assessed, an example student model can include an equal number of transformer layers (as the teacher) with student model parameters denoted by $\theta_s$, but with a smaller vocabulary, embedding dimensions, and/or hidden dimensions, as illustrated for example in FIG. 1. The size of the teacher and/or student model can be selected by the user in furtherance of various design goals. Using the same WordPiece algorithm and training corpus as BERT, a student vocabulary of 4,928 WordPieces can be obtained and used for the student model.

WordPiece tokens (See Wu et. al. Google's neural machine translation system: Bridging the gap between human and machine translation. arXiv preprint arXiv: 1609.08144, 2016b) are sub-word units obtained by applying a greedy segmentation algorithm to the training corpus: a desired number (say, D) of WordPieces are chosen such that the segmented corpus is minimal in the number of WordPieces used. In the example described above, an analysis of teacher and student vocabularies reveals that 93.9% of the WordPieces in the student vocabulary also exist in the teacher vocabulary, suggesting room for a reduction in the WordPiece vocabulary size from 30K tokens.

Although the WordPiece technique is one example technique that can be used to generate a vocabulary of subwords, other techniques can be used additionally or alternatively. The corpus(es) from which the student and teacher vocabularies are derived/generated can be the same or different corpuses. The size of the student vocabulary can be selected by the user in furtherance of various design goals.

Since one example objective is to train a general-purpose student language model, in some implementations, the teacher model's original training objective can be re-used to optimize the student model, or other objectives can additionally or alternatively be used. As examples, masked language modeling, two-way sentence sentiment classification, two-way sentence pair classification, and/or next sentence prediction can be performed, for example followed by fine-tuning. In the masked language modeling task, words, phrases, and/or entities in context are randomly masked, and the language model needs to predict those words, phrases, or entities given the masked context. In the next sentence prediction task, given a pair of sentences, the language model predicts whether the pair is consistent. The teacher can optionally be pre-trained according to various training techniques as well.

However, in some implementations, since the student vocabulary is not a complete subset of the teacher vocabulary, the two vocabularies may tokenize the same words differently. As a result, the outputs of the teacher and student model for the masked language modeling task may not align. Even with the high overlap between the two vocabularies, the need to train the student embedding from scratch, and the change in embedding dimension precludes existing knowledge distillation techniques, which rely on the alignment of both models' output spaces. As a result, two alternative approaches are proposed that enable implicit transfer of knowledge to the student model, which are described below.

Example Dual Training Techniques

In some implementations of the present disclosure, during distillation and for a given training sequence input to the teacher model, the teacher and student vocabularies can be mixed and input into the teacher and/or student model(s).

For example, a mix can be achieved by randomly selecting (e.g., with a probability $p_{DT}$, a hyperparameter) tokens from the training input sequence to segment using the student vocabulary, with the other tokens segmented using the teacher vocabulary. As illustrated in FIG. 1, given the input context ['I', 'like', 'machine', 'learning'], the words 'I' and 'machine' are segmented using the teacher vocabulary, while 'like' and 'learning' are segmented using the student vocabulary. This encourages alignment of the representations for the same word as per the teacher and student vocabularies. As one example, this can be effected through the masked language modeling task: the model now needs to learn to predict words from the student vocabulary using context words segmented using the teacher vocabulary, and vice versa.

Specifically, the student embeddings can be learned effectively this way from the teacher embeddings as well as model parameters $\theta_t$. In some implementations, as illustrated in FIG. 1, dual training (mixed sub-words) are performed only for the teacher model inputs: the student model receives words segmented exclusively using the student vocabulary. However, in other implementations, dual training (mixed sub-words) are performed for the student inputs as well. The inputs to the teacher and student models can be the same or different.

Also, in some implementations, during masked language modeling, each of the model(s) uses different softmax layers for the teacher and the student vocabularies depending on which one was used to segment the word in question, thereby allowing prediction to occur in the appropriate output space.

Although FIG. 1 illustrates simultaneous training of both the teacher language model and the student language model, each model can be individually trained within the illustrated scheme. In one example, the teacher embeddings are held fixed while the student embeddings are updated using to the illustrated scheme. For example, updates to the student embeddings can be obtained via the teacher model and/or student model.

Example Shared Projections Techniques

Relying solely on teacher model outputs to train the student model may not generalize well. Therefore, some approaches attempt to align the student model's intermediate predictions to those of the teacher. In the proposed setting illustrated in FIG. 1, however, since the student and teacher model output spaces are not identical, intermediate model outputs may prove hard to align.

Therefore, an example aspect of the present disclosure seeks to directly minimize the loss of information from the teacher model parameters $\theta_t$ to the student parameters $\theta_s$ with smaller dimensions. In particular, this can be achieved by projecting the model parameters into the same space, to encourage alignment.

More specifically, as in FIG. 1, each trainable variable in $\theta_t$ can be projected to the same shape as the corresponding variable in $\theta_s$. For example, for all the trainable variables $\theta_t$ which, in the example given, have shape 768×768, two projection matrices $U \in \mathbb{R}^{d \times 768}$ and $V \in \mathbb{R}^{768 \times d}$ can be learned to project them into the corresponding space of the student model variable $\theta_t'$, where d is the student model's hidden dimension. The teacher and student transformer layers can have any shape, not just the examples given. The shapes can be selected by the user. In addition, U and V are not needed for fine-tuning or inference after distillation.

In some implementations, a respective pair of projection matrices U and V can be common to all model parameters that have a common dimensionality. Thus, one or more pairs of projection matrices may be used to respectively project between one or more sets of transformer layers that have common dimensionality. Each pair of projection matrices can serve one or more transformer layers.

Optionally, in order to align the student variable and the teacher variable's projection, a separate mean square error loss can be introduced, as defined in Equation 1, where L stands for down projection (since the projection is to a lower dimension).

$$L_p^\downarrow = \sum_{\theta_t', \theta_s' \subset \theta_t, \theta_s} \|U\theta_t' V - \theta_s'\|^2 \qquad (1)$$

The above loss function aligns the trainable variables in the student space. Alternatively, we can project trainable variables in $\theta_s$ to the same shape as in $\theta_t$. This way, the loss function in Equation 2, (T denotes up projection) can compare the trainable variables in the teacher space.

$$L_p^\uparrow = \sum_{\theta_t', \theta_s' \subset \theta_t, \theta_s} \|\theta_t' - V\theta_s' U\|^2 \qquad (2)$$

The loss shown in Equation 1 and/or 2 can optionally be combined with other losses (e.g., a masked language modeling task, a next sentence prediction loss, etc.) and can be used to learn the optimal parameter values of the teacher language model and/or student language model.

Example Optimization Objective

One example final loss function includes, in addition to an optional projection loss, masked language modeling cross-entropy losses for the student as well as the teacher models, since, in some implementations, the teacher model is trained with dual-vocabulary inputs and is not static. $P(y_i=c|\theta_s)$ and $P(y_i=c|\theta_t)$ denote the student and teacher model prediction probabilities for class c respectively, and 1 denotes an indicator function. Equations 3 and 4 below define an example final loss $L_{final}$, where $\varepsilon$ is a hyperparameter.

$$L_{ce} = \sum_i \left( \sum_{c \in C} [1_{[y_i]=c} \log P(y_i = c | \theta_s)] + \sum_{c \in C} [1_{[y_i]=c} \log P(y_i = c | \theta_t)] \right) \qquad (3)$$

$$L_{final} = L_p + \varepsilon \times L_{ce} \qquad (4)$$

Example Devices and Systems

Figure 2A:
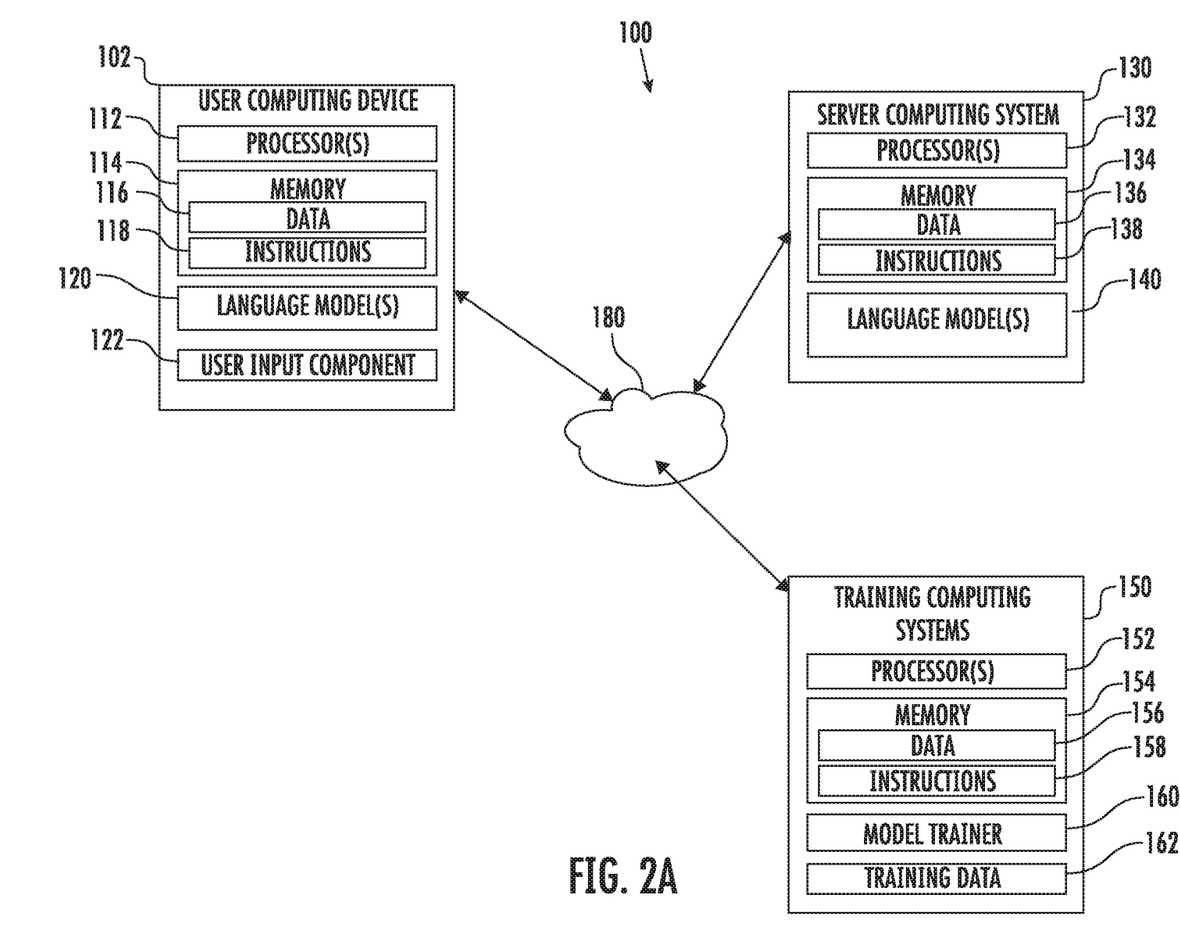
FIGS. 2A-C depict block diagrams of example computing systems and devices according to example embodiments of the present disclosure.

FIG. 2A depicts a block diagram of an example computing system 100 that trains and/or deploys machine-learned language models according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIG. 1. Machine-learned models 120 can include, for example, student models and/or teacher models.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel natural language processing across multiple instances of natural language inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a natural language processing service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 1. Machine-learned models 120 can include, for example, student models and/or teacher models.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, natural language training inputs. For example, natural language training inputs can include sentences, phrases, or other sequences of tokens from a training corpus such as a collection of books and/or webpages.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2B:
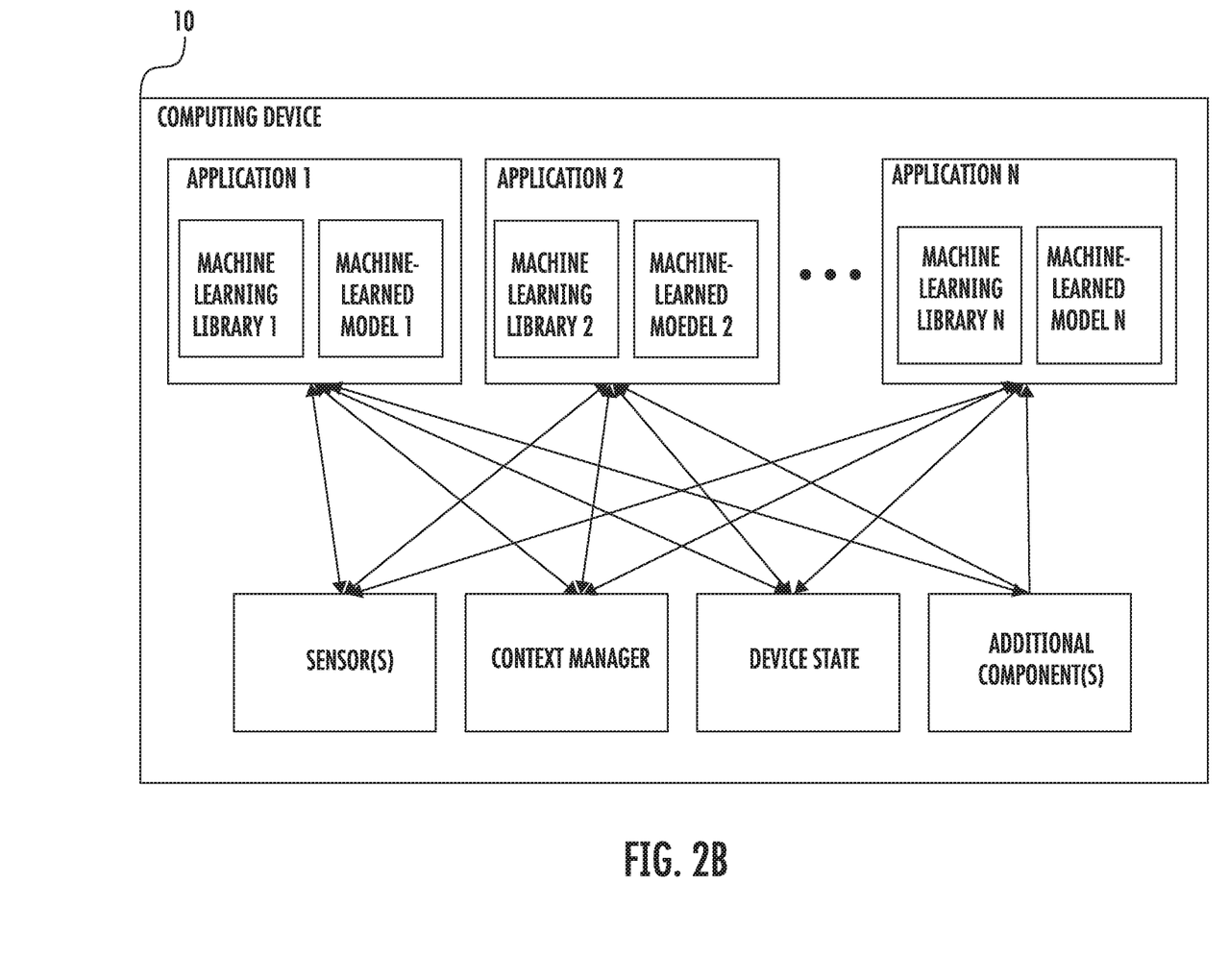

FIG. 2B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
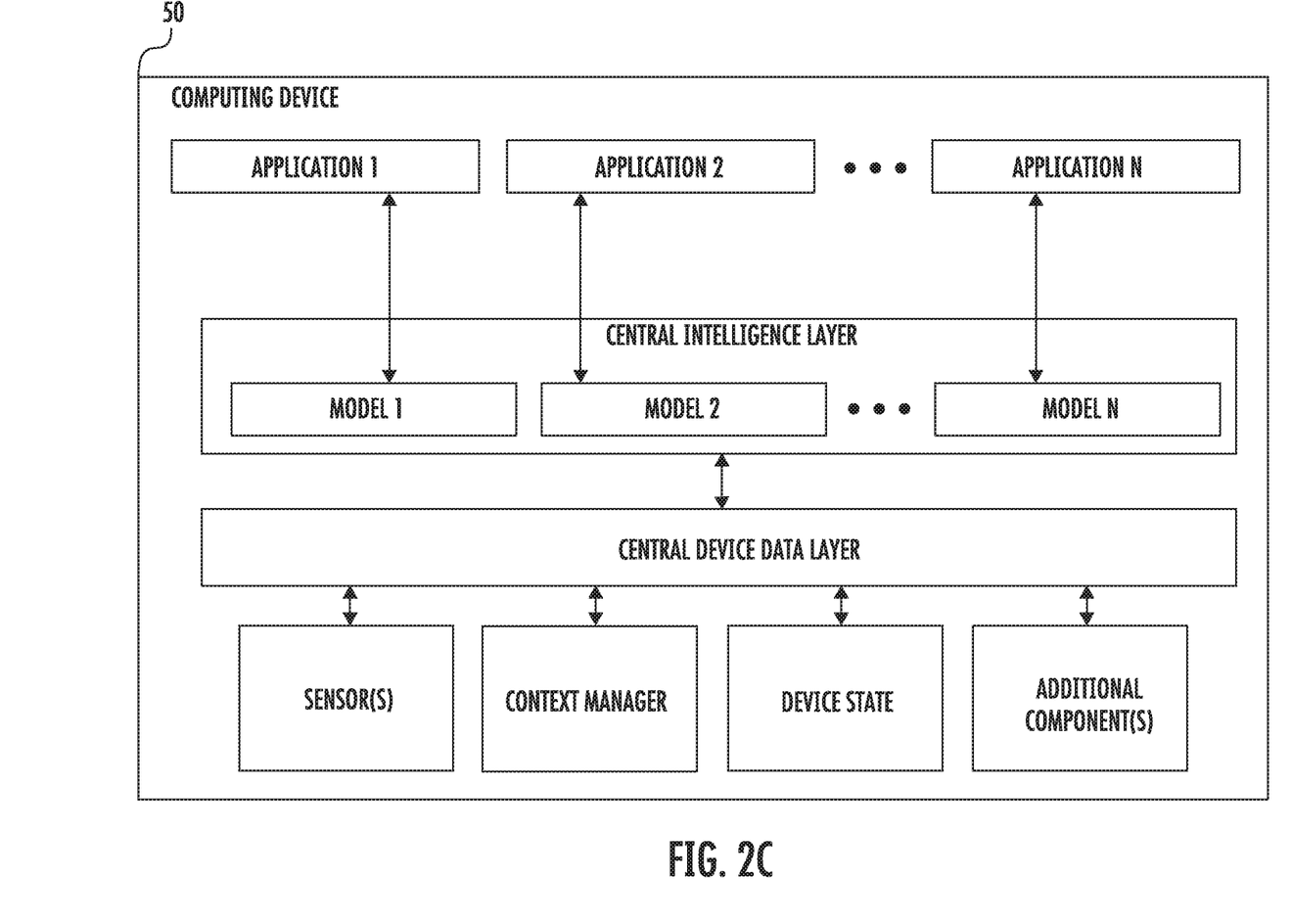

FIG. 2C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 3:
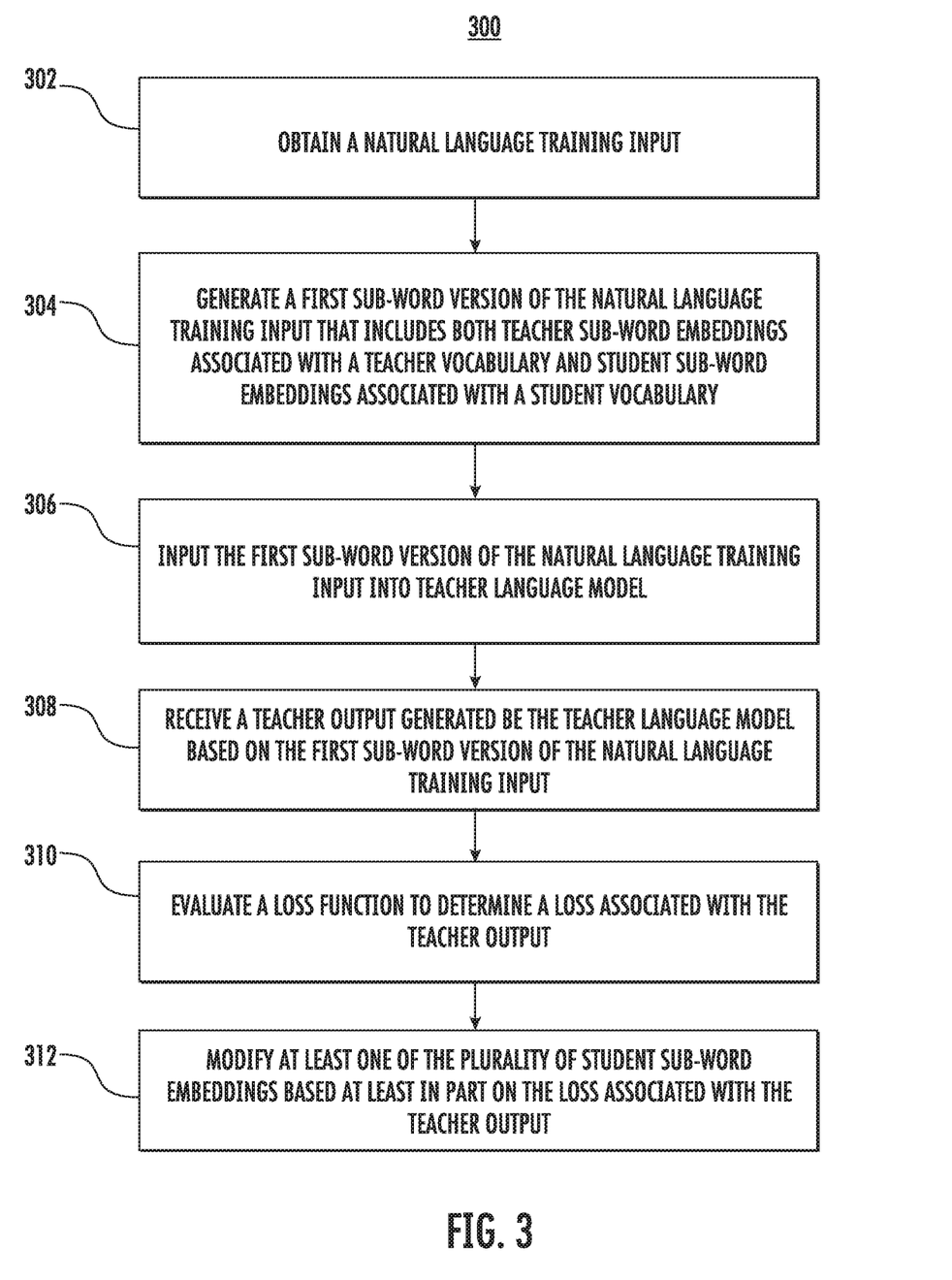
FIG. 3 depicts a flow chart diagram of an example method to learn a student language model according to example embodiments of the present disclosure.
Figure 4:
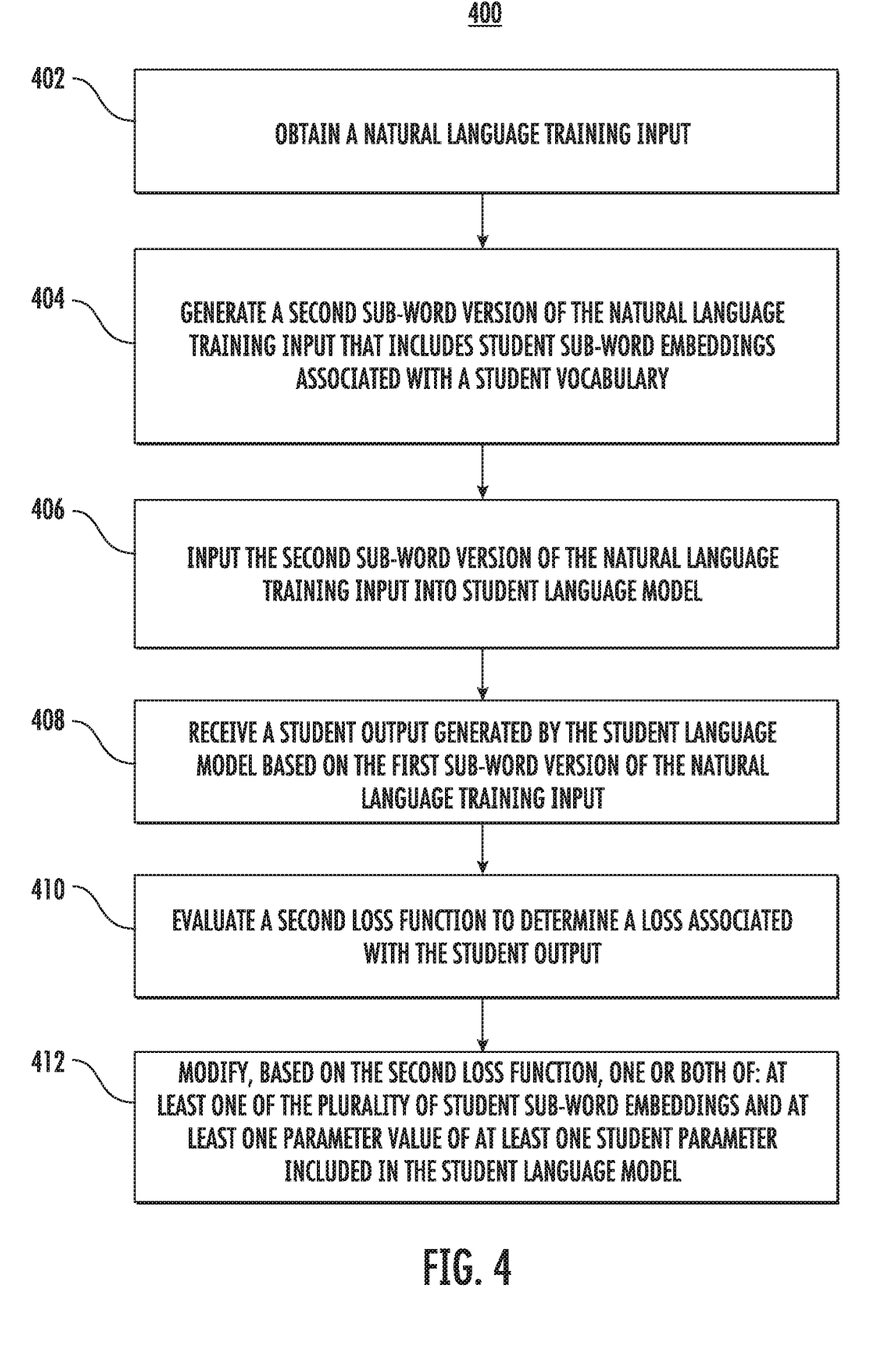
FIG. 4 depicts a flow chart diagram of an example method to learn a student language model according to example embodiments of the present disclosure.
Figure 5:
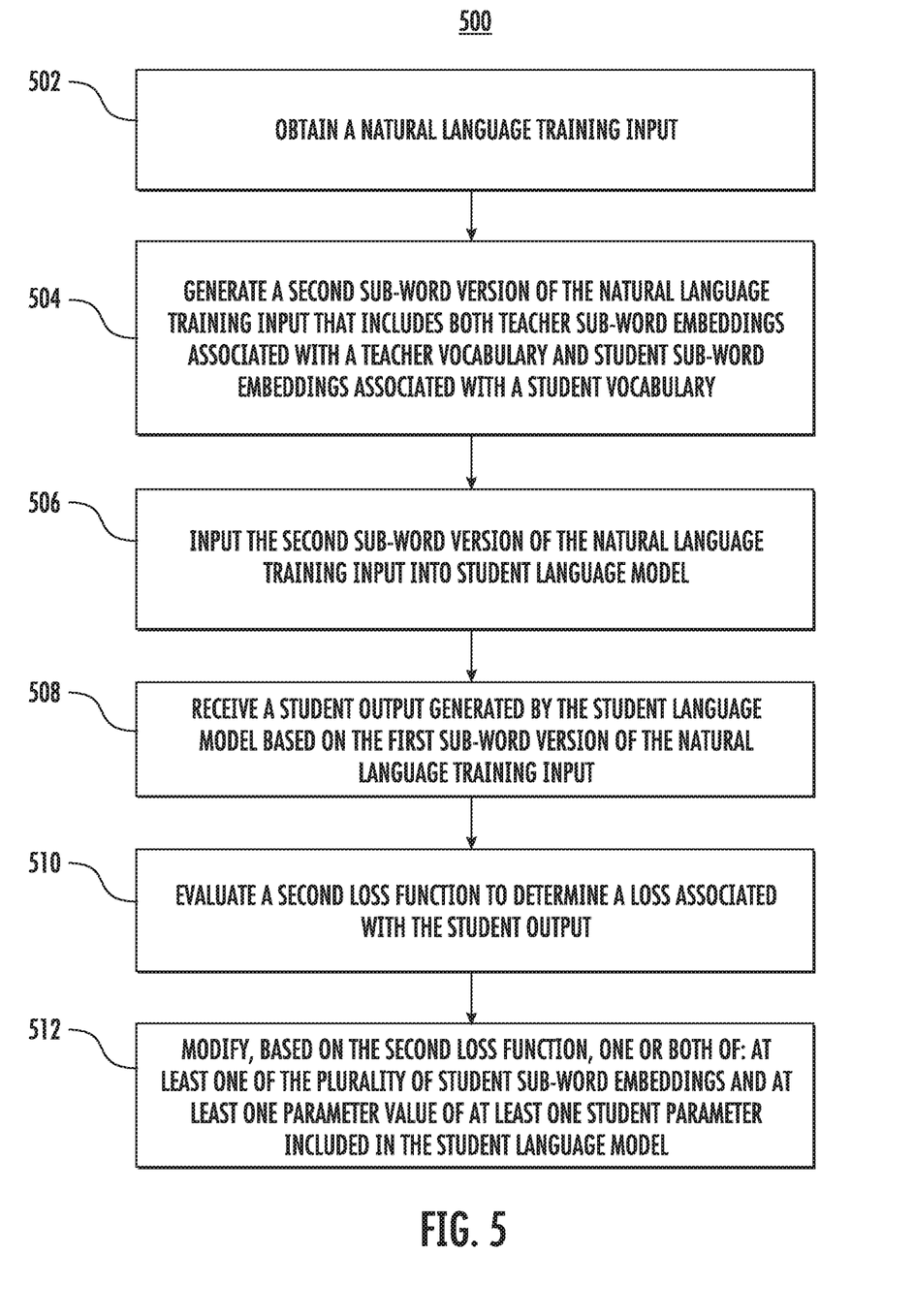
FIG. 5 depicts a flow chart diagram of an example method to learn a student language model according to example embodiments of the present disclosure.

FIGS. 3-5 depict flow chart diagrams of example methods to learn a student model and/or vocabulary according to example embodiments of the present disclosure. Although FIGS. 3-5 depicts steps performed in a particular order for purposes of illustration and discussion, the methods of the present disclosure are not limited to the particularly illustrated order or arrangement. The various steps of the illustrated methods can be omitted, rearranged, combined, and/or adapted in various ways without deviating from the scope of the present disclosure.

Referring first to FIG. 3, at 302, a computing system can obtain a natural language training input. For example, the natural language training input can include a sequence of n-grams such as words.

At 304, the computing system can generate a first sub-word version of the natural language training input that includes student sub-word embeddings associated with a student vocabulary. The first sub-word version can, in some implementations, also include teacher sub-word embeddings associated with a teacher vocabulary. For example, the teacher vocabulary can include a larger number of sub-words relative to the student vocabulary.

At 306, the computing system can input the first sub-word version of the natural language training input into a teacher language model. For example, the teacher language model can be a pre-trained teacher language model. For example, the teacher language model can have a larger number of parameters relative to a student language model.

At 308, the computing system can receive a teacher output generated by the teacher language model based on the first sub-word version of the natural language training input. For example, the output can be an output for any number of training tasks such as masked language modeling, two-way sentence sentiment classification, two-way sentence pair classification, next sentence prediction, and/or others.

At 310, the computing system can evaluate a loss function to determine a loss associated with the teacher output. For example, the loss function can be a log loss function. The loss function can also include other loss terms such as a student loss, a layer-wise loss, and/or others.

At 312, the computing system can modify at least one of the plurality of student sub-word embeddings based at least in part on the loss associated with the teacher output. In such fashion, the student vocabulary sub-word embeddings can be optimized based on knowledge contained within the teacher model.

In some implementations, at 312, the computing system can also modify at least one of the plurality of teacher sub-word embeddings based at least in part on the loss. Thus, the teacher embeddings can be learned jointly with the student embeddings. In some implementations, at 312, the computing system can also modify at least one parameter value of the teacher model based at least in part on the loss. Thus, the teacher model can be learned jointly with the student embeddings. In some implementations, at 312, the computing system can also modify at least one projection matrix value based at least in part on the loss.

The steps of FIG. 3 can be repeated iteratively for a number of natural language training examples.

Referring now to FIG. 4, the method 400 of FIG. 4 can be performed independently of the method 300 of FIG. 3 or can be performed jointly (e.g., simultaneously) with the method 300 of FIG. 3.

At 402, a computing system can obtain a natural language training input. The natural language training input can be the same or different from the input described at 302.

At 404, the computing system generates a second sub-word version of the natural language training input that includes (e.g., exclusively) student sub-word embeddings associated with a student vocabulary.

At 406, the computing system can input the second sub-word version of the natural language training input into a student language model. For example, the student language model can have a smaller number of parameters relative to a teacher language model.

At 408, the computing system can receive a student output generated by the student language model based on the second sub-word version of the natural language training input. For example, the output can be an output for any number of training tasks such as masked language modeling, two-way sentence sentiment classification, two-way sentence pair classification, next sentence prediction, and/or others.

At 410, the computing system can evaluate a second loss function to determine a loss associated with the student output. For example, the second loss function can be a log loss function. The loss function can also include other loss terms such as a teacher loss, a layer-wise loss, and/or others.

At 412, the computing system can modify, based on the second loss function, one or both of: at least one of the plurality of student sub-word embeddings; and at least one parameter value of at least one student parameter included in the student language model.

In some implementations, at 412, the computing system can also modify at least one parameter value of the teacher model based at least in part on the loss. Thus, the teacher model can be learned jointly with the student embeddings. In some implementations, at 412, the computing system can also modify at least one projection matrix value based at least in part on the loss.

Referring now to FIG. 5, the method 500 of FIG. 5 can be performed independently of the method 300 of FIG. 3 or can be performed jointly (e.g., simultaneously) with the method 300 of FIG. 3.

At 502, a computing system can obtain a natural language training input. The natural language training input can be the same or different from the input described at 302.

At 504, the computing system generates a second sub-word version of the natural language training input that includes student sub-word embeddings associated with a student vocabulary and teacher sub-word embeddings associated with a teacher vocabulary. As examples, the second sub-word version of the natural language training input generated at 504 can be the same as or different from the first sub-word version of the natural language training input generated at 304.

At 506, the computing system can input the second sub-word version of the natural language training input into a student language model. For example, the student language model can have a smaller number of parameters relative to a teacher language model.

At 508, the computing system can receive a student output generated by the student language model based on the second sub-word version of the natural language training input. For example, the output can be an output for any number of training tasks such as masked language modeling, two-way sentence sentiment classification, two-way sentence pair classification, next sentence prediction, and/or others.

At 510, the computing system can evaluate a second loss function to determine a loss associated with the student output. For example, the second loss function can be a log loss function. The loss function can also include other loss terms such as a teacher loss, a layer-wise loss, and/or others.

At 512, the computing system can modify, based on the second loss function, one or both of: at least one of the plurality of student sub-word embeddings; and at least one parameter value of at least one student parameter included in the student language model.

In some implementations, at 512, the computing system can also modify at least one of the plurality of teacher sub-word embeddings based at least in part on the loss. Thus, the teacher embeddings can be learned jointly with the student embeddings. In some implementations, at 512, the computing system can also modify at least one parameter value of the teacher model based at least in part on the loss. Thus, the teacher model can be learned jointly with the student embeddings. In some implementations, at 512, the computing system can also modify at least one projection matrix value based at least in part on the loss.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system that performs language model compression, the computing system comprising:
    one or more processors; and
    one or more non-transitory computer-readable media that collectively store:
        a teacher language model, wherein a teacher vocabulary that contains a plurality of teacher sub-words is associated with the teacher language model, and wherein a plurality of teacher sub-word embeddings are respectively associated with the plurality of teacher sub-words;
        a student language model, wherein a student vocabulary that contains a plurality of student sub-words is associated with the student language model, wherein a plurality of student sub-word embeddings are respectively associated with the plurality of student sub-words, and wherein a number of student sub-words contained in the student vocabulary is less than a number of teacher sub-words contained in the teacher vocabulary; and
        instructions that, when executed by the one or more processors, cause the computing system to perform operations, the operations comprising:
            obtaining a natural language training input;
            generating a first sub-word version of the natural language training input that comprises at least one of the teacher sub-word embeddings associated with the teacher vocabulary and at least one of the student sub-word embeddings associated with the student vocabulary;
            inputting the first sub-word version of the natural language training input into at least the teacher language model;
            receiving a teacher output generated by the teacher language model based on the first sub-word version of the natural language training input;
            evaluating a loss function to determine a loss associated with the teacher output; and
            modifying at least one of the plurality of student sub-word embeddings based at least in part on the loss associated with the teacher output.

2. The computing system of claim 1, wherein the operations further comprise:
    generating a second sub-word version of the natural language training input that comprises only student sub-word embeddings associated with the student vocabulary;
    inputting the second sub-word version of the natural language training input into at least the student language model;
    receiving a student output generated by the student language model based on the second sub-word version of the natural language training input;
    evaluating a second loss function to determine a second loss associated with the student output; and
    modifying, based at least in part on the second loss associated with the student output, one or both of:
        at least one of the plurality of student sub-word embeddings; and
        at least one parameter value of at least one student parameter included in the student language model.

3. The computing system of claim 1, wherein the operations further comprise:
    generating a second sub-word version of the natural language training input that comprises both teacher sub-word embeddings associated with the teacher vocabulary and student sub-word embeddings associated with the student vocabulary;
    inputting the second sub-word version of the natural language training input into at least the student language model;
    receiving a student output generated by the student language model based on the second sub-word version of the natural language training input;
    evaluating a second loss function to determine a second loss associated with the student output; and
    modifying at least one of the plurality of student sub-word embeddings based at least in part on the second loss associated with the teacher output.

4. The computing system of claim 1, wherein:
    generating the first sub-word version of the natural language training input comprises masking at least one word of the natural language training input; and
    the teacher output comprises a prediction of the at least one word of the natural language training input that was masked within a pre-selected one of the teacher or student vocabularies.

5. The computing system of claim 1, wherein the teacher language model and the student language model comprise respective Bidirectional Encoder Representations from Transformers (BERT) models.

6. The computing system of claim 1, wherein each of the teacher language model and the student language model comprise one or more transformer layers, and wherein the operations further comprise:
    modifying at least one parameter value of at least one transformer layer of the student language model to reduce a different between the at least one transformer layer of the student language model and at least one transformer layer of the teacher language model when projected into a shared space.

7. The computing system of claim 1, wherein the teacher language model and the student language model comprise an equal number of transformer layers, and wherein the student language model has a smaller number of parameters than the teacher language model.

8. The computing system of claim 1, wherein the teacher language model applies two separate softmax layers to respectively make predictions over the student vocabulary and the teacher vocabulary.

9. The computing system of claim 1, wherein each of the teacher vocabulary and the student vocabulary comprise respective sets of WordPiece tokens.

10. The computing system of claim 1, wherein the operations further comprising:

deploying the student language model to a mobile or edge device for on-device inference at the mobile or edge device.

11. The computing system of claim 1, wherein generating the first sub-word version of the natural language training input comprises randomly selecting, according to a probability hyperparameter, tokens from the natural language training input to segment using the student vocabulary.

12. The computing system of claim 11, wherein the computing system performs the operations for a plurality of iterations, and wherein the computing system ramps the probability hyperparameter over the plurality of iterations to increase a ratio of tokens that are selected for segmentation using the student vocabulary.

13. A computer-implemented method, the method comprising:
    obtaining data descriptive of a teacher vocabulary that contains a plurality of teacher sub-words and a student vocabulary that contains a plurality of student sub-words, wherein a plurality of teacher sub-word embeddings are respectively associated with the plurality of teacher sub-words and a plurality of student sub-word embeddings are respectively associated with the plurality of student sub-words, and wherein a number of student sub-words contained in the student vocabulary is less than a number of teacher sub-words contained in the teacher vocabulary;
    obtaining a natural language training input;
    generating a sub-word version of the natural language training input that comprises at least one of the teacher sub-word embeddings associated with a teacher vocabulary and at least one of the student sub-word embeddings associated with a student vocabulary;
    inputting the sub-word version of the natural language training input into a language model;
    receiving an output generated by the language model based on the sub-word version of the natural language training input;
    evaluating a loss function to determine a loss associated with the output; and
    modifying, based at least in part on the loss associated with the output, one or both of:
        at least one of the plurality of student sub-word embeddings; and
        at least one parameter value of the language model.

14. The computer-implemented method of claim 13, wherein:
    generating the sub-word version of the natural language training input comprises masking at least one word of the natural language training input; and
    the output comprises a prediction of the at least one word of the natural language training input that was masked within a pre-selected one of the teacher or student vocabularies.

15. The computer-implemented method of claim 13, wherein the language model comprises a teacher language model.

16. The computer-implemented method of claim 13, wherein the language model comprises a student language model.

17. The computer-implemented method of claim 13, wherein said modifying comprises modifying the at least one of the plurality of student sub-word embeddings.

18. The computer-implemented method of claim 13, wherein said modifying comprises modifying the at least one parameter value of the language model.

19. One or more non-transitory computer-readable media that collectively store:
    a teacher language model that comprises one or more teacher intermediate layers;
    a student language model that comprises one or more student intermediate layers that respectively correspond to the one or more teacher intermediate layers to form one or more pairs; and
    instructions that, when executed by one or more processors, cause the one or more processors to perform operations, the operations comprising, for each of the one or more pairs of teacher intermediate layers and student intermediate layers:
        projecting teacher parameter values of the teacher intermediate layer or student parameter values of the student intermediate layer into a shared space;
        determining a loss value based on a difference between the teacher parameter values of the teacher intermediate layer and the student parameter values of the student intermediate layer within the shared space; and
        modifying at least one of the teacher parameter values of the teacher intermediate layer or the student parameter values of the student intermediate layer to reduce the loss value.

20. The one or more non-transitory computer-readable media of claim 19, wherein the teacher intermediate layers and student intermediate layers comprise respective transformer layers.

* * * * *